Jan. 26, 1943.   A. B. NEWTON   2,309,207
ELECTRIC SWITCH
Filed Oct. 14, 1938
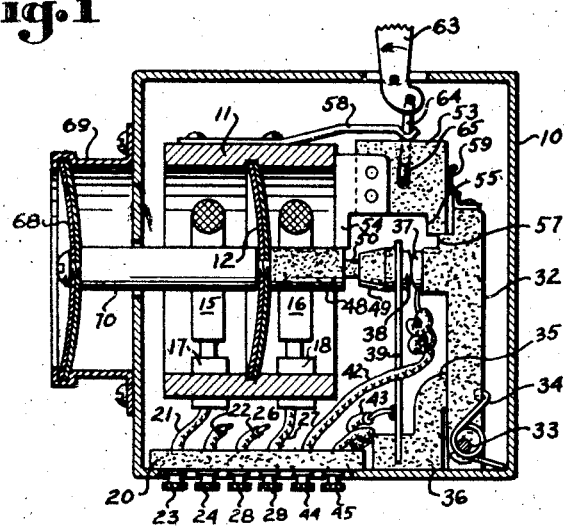
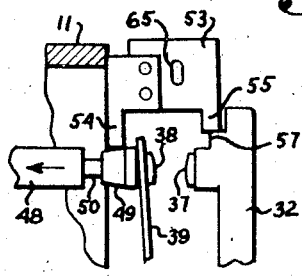
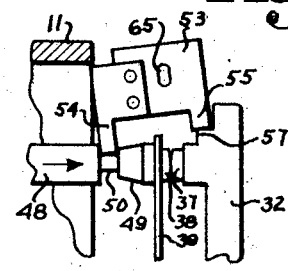
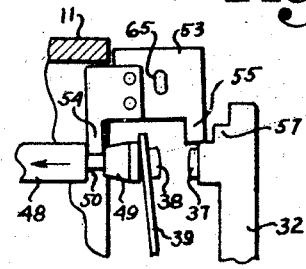
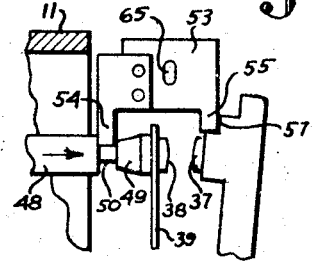
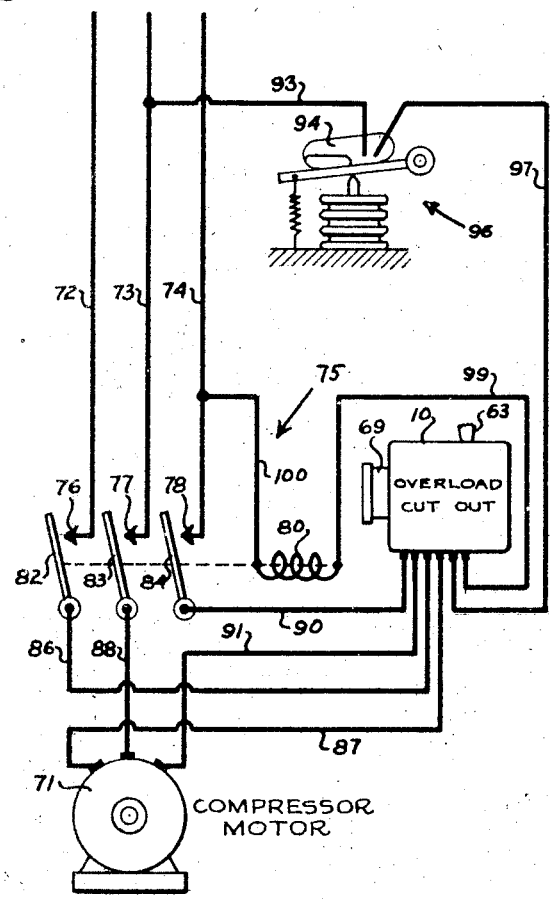
INVENTOR
Alwin B. Newton
BY
George H Fisher
ATTORNEY Patented Jan. 26, 1943

2,309,207

UNITED STATES PATENT OFFICE 2,309,207

ELECTRIC SWITCH

Alwin B. Newton, Minneapolis, Minn., assignor to Minneapolis-Honeywell Regulator Company, Minneapolis, Minn., a corporation of Delaware Application October 14, 1938, Serial No. 234,989

15 Claims. (Cl. 200—122)

This invention relates to electric switches and more particularly to the type of switch adapted to interrupt a circuit when the flow of current becomes excessive. This type of switch is commonly known as an overload cut-out.

The usual overload cut-out automatically opens the circuit being protected when an excessive current passes through the circuit. Once this type of cut-out has been automatically tripped it is necessary to manually reset it to re-establish the circuit. In some cases, however, as exemplified by a refrigeration compressor motor the fact that excessive current flows in the circuit on the first attempt to start is not necessarily an indication that a permanent overload condition will exist. Consequently it may be desirable to attempt to start the motor automatically two or more times before finally opening the circuit. The present invention involves an overload cut-out which will provide this function.

An object of the invention is to provide a switch which will automatically open and close an electric circuit a predetermined number of times on excessive current conditions before finally leaving the circuit open.

Another object is to provide a thermally actuated overload cut-out which will automatically open and close the circuit being protected a predetermined number of times on overload before finally leaving the circuit open but which will close the circuit if the overload disappears before the cut-out has been finally opened.

Another object is to provide an overload cut-out for a refrigeration compressor motor which will perform the above functions.

Another object is to provide a thermally actuated switch which is compensated for changes in ambient temperature.

Other objects will appear from the specification and appended claims and from the drawing in which:

Figure 1 is a sectional view of an overload cut-out embodying the present invention, Figures 2, 3, 4, and 5 are views showing the position of certain of the parts illustrated in Figure 1 in various stages of operation, and Figure 6 is a diagrammatic view of the overload cut-out of Figure 1 as employed in a three-phase refrigeration compressor motor circuit.

The control mechanism shown in Figure 1 is adapted to protect against overload in a three-phase circuit. Mounted within a casing 10 is a cylindrical heater chamber 11 of heat insulating material and approximately midway of the length of the chamber 11 is mounted a snap action thermostatic disc 12. Toward the left of thermostatic disc 12 is a U-shaped heater 15. Heater 15 is removable and is normally plugged into two sockets mounted in the lower part of the heater chamber 11. One of these sockets 17 is shown. Similarly, a removable heater 16 is mounted to the right of the thermostatic disc 12, one of the sockets 18 for mounting heater 16 being shown. It will be understood by those skilled in the art that heaters 15 and 16, placed in two lines of a three-phase circuit, will become excessively hot if an overload occurs in any of the three phases. Since the two heaters and thermostatic disc 12 are in a heat insulating chamber, the temperature of disc 12 will be substantially that of the hottest heater.

A terminal block 20 is mounted in the lower part of casing 10 and is provided with a series of binding posts extending through an opening in casing 10. Lead wires 21 and 22 connect the two ends of heater 15 with binding posts 23 and 24, while wires 26 and 27 connect the two ends of heater 16 with binding posts 28 and 29.

A contact support arm 32 is pivotally mounted with respect to casing 10 on a pivot 33. A spring 34 surrounding pin 33 biases arm 32 against a stop 35 which is a part of an insulating block 36 rigidly attached to casing 10. A contact 37 is carried by arm 32 on the side thereof toward thermostatic disc 12. A contact 38, adapted to make with contact 37, is carried by a spring blade 39 which in turn is carried by insulating block 36. Spring blade 39 is shaped so as to hold contact 38 away from contact 37 unless forced into engagement therewith by other parts of the mechanism. Wires 42 and 43 connect contacts 37 and 38 with binding posts 44 and 45, respectively, on terminal block 20.

A contact operating post 48 extends horizontally to the right from the center of thermostatic disc 12 and is rigidly attached thereto. Movements of thermostatic disc 12 to the left as will occur on excessive heating of heaters 15 and 16 will move post 48 to the left and allow spring blade 39 to assume its natural shape and therefore move contact 38 out of engagement with contact 37.

For simplicity of construction post 48 is made round. Near its right end, post 48 is turned to form a conical portion 49 and a notch 50, the purpose of which will be hereinafter set forth.

A block 53 located immediately above the contacts has a downwardly extending portion 54 resting on post 48 and having a width only slightly less than the longitudinal dimension of notch

50, and a second downwardly extending portion 55 which rests on an extension 57 of contact support arm 32. The purpose of making block 53 of two separate materials as shown, portion 54 being of metal, is to insure portion 54 against breakage due to its necessarily thin configuration.

A leaf spring 58 secured to the upper portion of heater chamber 11 biases block 53 downwardly while a leaf spring 59 mounted on contact support arm 32 biases block 53 to the left and against the upper portion of chamber 11 when the parts are in the position shown in Figure 1.

A manual reset lever 63 is pivoted in the casing 10. The lower end of lever 63 is attached to a connection 64 which in turn passes through a slot 65 in block 53.

In order to assure uniform operation of the device at various ambient temperatures a second thermostatic element 68 is mounted outside the casing 10 by means of a support 69. A post 70 extends between thermostatic element 68 and thermostatic disc 12 so they will necessarily move together. Thermostatic element 68 is of the slow action type rather than snap acting as thermostatic disc 12. As shown in Figure 1 disc 12 is in its "cold" position so that contacts 37 and 38 are in engagement. The high expansion metal of bimetal disc 12 is on the left so that heat supplied to the heaters 15 and 16 tends to buckle disc 12 to the left to open the contacts. If no ambient temperature compensation was provided heaters 15 and 16 would cause disc 12 to snap to the left at a lower current flow when the ambient temperature was high than when it was low. By mounting disc 68 to oppose the action of disc 12 it is possible to load disc 12 at higher ambient temperatures so that the temperature at which it operates will depend only on the amount of heat being thrown off by heaters 15 and 16.

The operation of this overload cut-out will be seen from Figures 1 through 5. Figure 1 shows the normal position of the operating parts of the device. Downwardly extending portion 54 of block 53 is resting on the cylindrical portion of post 48 while downwardly extending portion 55 is resting on extension 57 of contact arm 32. When heaters 15 and 16 become excessively hot thermostatic disc 12 will snap to the left allowing contact 38 to move away from contact 37. Block 53 will then have assumed the position shown in Figure 2. Since notch 50 is practically the same size as portion 54 of block 53 and since post 48 has moved to the left very rapidly, portion 54 will jump over notch 50 and drop down slightly to conical portion 49. Opening of contacts 37 and 38 stops the flow of current through heaters 15 and 16 so that thermostatic disc 12 will start to cool off. When it cools sufficiently it will operate to snap the contacts to their closed position as shown in Figure 3. But since portion 54 was resting on the conical surface 49 movement of post 48 to the right will result in portion 54 sliding into notch 50. The parts are so proportioned that this position of block 53 allows the contacts to reclose.

If the overload has not been removed from the line, heaters 15 and 16 will again become excessively hot and again snap thermostatic disc 12 to the left and the parts will assume the position shown in Figure 4. This action will reopen the contacts and since portion 54 of block 53 is engaged by notch 50, block 53 will be moved to the left with post 48. When portion 54 fell into notch 50 the upper portion of block 53 was lowered enough so that it is now able to slide under the portion of heater chamber 11 which it had formerly abutted. The downwardly extending portion 55 on the right hand end of the block 53 is pulled to the left sufficiently to enable it to drop from extension 57 of contact support arm 32. The circuit to the heaters is now open and they will start to cool down.

When thermostatic disc has cooled sufficiently it will again snap to the right forcing the parts into the position shown in Figure 5. Portion 54 of block 53 is forced to the right by notch 50 and the other downwardly extending portion 55 having engaged extension 57 of arm 32 is in a position to force arm 32 to the right. Although contact 38 is here moved to the position in which it normally engages contact 37, contact 37 has been moved out of the way and reclosing of the circuit cannot occur.

In order to reestablish the circuit when the parts have assumed the position shown in Figure 5, it is necessary to operate the manual reset lever 63. Operating lever 63 lifts the block 53 upwardly against the tension of spring 58, disengaging portion 54 from notch 50 and portion 55 from extension 57 of arm 32, allowing arm 32 to move contact 37 back to normal position as shown in Figure 1. To prevent block 53 from assuming the position shown in Figure 3, spring 59 is provided to bias block 53 to the left so that downwardly extending portion 54 is sure to rest on the cylindrical portion of post 48 when lifted by operation of the manual reset lever.

In controlling a single phase circuit only one of the heaters 15 or 16 would be employed and the circuit could be broken directly through contacts 37 and 38.

However, in protecting a three-phase circuit against overload it is desirable to employ a relay to break each of the three phases. Such an arrangement is shown in Figure 6.

A refrigeration compressor motor 71 is supplied with electric current by three supply wires 72, 73, and 74, which terminate in contacts 76, 77, and 78, respectively, of a relay 75 having an operating coil 80. Relay 75 also has contact arms 82, 83, and 84 which are adapted to cooperate with contacts 76, 77, and 78, respectively. A wire 86 connects contact arm 82 with binding post 28 shown in Figure 1 while binding post 29 which is connected to the other side of the same heater 16 is connected to compressor motor 71 by a wire 87. Contact arm 83 is directly connected to motor 71 by a wire 88. A wire 90 connects contact arm 84 with binding post 22 shown in Figure 1 while the associated binding post 23 is connected to motor 71 by a wire 91.

The contacts 37 and 38 of the device of Figure 1 are here connected in a control circuit. The control circuit includes a wire 93 leading from supply wire 73 to one terminal of a mercury switch 94 of a controller 96 which may be responsive to anyone of a number of conditions such as temperature or pressure. The other terminal of switch 94 is connected by a wire 97 to binding post 44 which binding post is connected to contact 37 of the device of Figure 1. Binding post 45 is connected by a wire 99 to one side of relay operating coil 80. Wire 100 connects the other side of operating coil 80 to supply wire 74 to complete the control circuit. Since the contacts 37 and 38 of the device of Figure 1 are normally closed, relay 75 is normally closed when controller 96 has tipped mercury switch 94 to closed position due to a need for refrigeration. Overload in any of the wires of the supply circuit will, however, result in opening of the contacts of the cut-out device as previously described to deenergize the operating coil 80 of relay 75 and consequently stop motor 71.

It will be seen that an overload cut-out has been provided which automatically opens and closes the circuit being protected a predetermined number of times before positively opening the circuit.

The device described should be considered as illustrative only and the scope of the invention is to be determined only by the appended claims.

I claim as my invention:

1. In an electrical switch, in combination, a normally stationary contact, a movable contact movable into and out of engagement with the normally stationary contact when in its normal position, first means to move the movable contact, and second means actuated by the first means to move the normally stationary contact out of the range of movement of the movable contact after a predetermined number of movements of the movable contact.

2. In an electrical switch, in combination, a normally stationary contact, a movable contact movable into and out of engagement with the normally stationary contact when in its normal position, first means to move the movable contact, second means actuated by the first means to move the normally stationary contact out of the range of movement of the movable contact after a predetermined number of movements of the movable contact, and manually operable means to return the normally stationary contact to its normal position.

3. In an electrical switch, in combination, a first contact, a support for said first contact holding it normally stationary, a second contact, means to move said second contact into and out of engagement with said first contact when said first contact is in its normally stationary position, a shoulder on said means, a ledge on said support, and a member cooperable with said shoulder and said ledge after a predetermined number of movements of said movable contact to move said first contact out of the range of movement of said second contact.

4. In an electrical switch, in combination, a first contact, a support for said first contact holding it normally stationary, a second contact, means to move said second contact into and out of engagement with said first contact when said first contact is in its normally stationary position, a shoulder on said means, a ledge on said support, a member cooperable with said shoulder and said ledge after a predetermined number of movements of said movable contact to move said first contact out of the range of movement of said second contact, and manually operable means to release said member from said shoulder and said ledge.

5. In an electrical switch, in combination, a first contact, a support for said contact to hold it normally stationary, a ledge on said support, a second contact normally in engagement with said first contact, means to move said second contact into and out of engagement with said first contact with a snap action when said first contact is in its normally stationary position, a member movable with said second contact including a raised portion, a reduced portion intermediate said raised portion and said second contact, and a notch between said raised and said reduced portions, and a member having a projection of substantially the width of said notch and a part normally extending over said ledge, said projection normally resting against said raised portion and adapted to fall to said reduced portion on the first snap opening movement of said second contact, and to fall into said notch on reclosing of said contacts, and said part being adapted to engage said ledge on the second closing movement of said first contact to force said first contact out of the range of movement of said second contact.

6. An automatic resetting circuit breaker comprising a thermostatic element, an electrical heater in heat exchange relation to the thermostatic element adapted to heat the element in proportion to the current flowing in a circuit being protected, a switch in control of the circuit being protected comprising a movable contact operatively connected to the thermostatic element and a normally stationary contact, the thermostatic element being adapted to move the movable contact out of engagement with the normally stationary contact on heating thereof to a predetermined temperature and to move the movable contact back into engagement with the normally stationary contact on cooling thereof to a predetermined lower temperature, and means actuated by the thermostatic element for moving the normally stationary contact out of engagement with the movable contact due to overload in the circuit being protected.

7. An automatically resetting circuit breaker comprising a thermostatic disc of the type adapted to snap to one position on attaining a predetermined temperature and to snap to another position at a predetermined lower temperature, a heater in series with the circuit being protected and in heat exchange relation with the thermostatic disc, a switch in control of the circuit being protected comprising a movable contact operatively connected to the thermostatic disc and a normally stationary contact, and means actuated by the thermostatic disc to move the normally stationary contact out of the range of movement of the movable contact after a predetermined number of movements of the movable contact due to overload in the circuit being protected.

8. In an electric switch, in combination, a normally stationary contact, a movable contact movable into and out of engagement with the normally stationary contact when in its normal position, a thermostatic element, a heater adapted to heat the thermostatic element to move the movable contact, and means actuated by the thermostatic element to move the normally stationary contact out of the range of movement of the movable contact after a predetermined number of movements of the movable contact.

9. In an electric switch, in combination, a normally stationary contact, a movable contact movable into and out of engagement with the normally stationary contact when in its normal position, a heater, a thermostatic element adapted to move the movable contact out of engagement with the normally stationary contact with a snap action when heated to a predetermined temperature by the heater, and to move the movable contact into engagement with the normally stationary contact with a snap action at a predetermined lower temperature, and means actuated by the thermostatic element to move the normally stationary contact out of the range of movement of the movable contact after a predeterrmined number of movements of the movable contact.

10. In an electric switch, in combination, a normally stationary contact, a movable contact movable into and out of engagement with the normally stationary contact when in its normal position, a heater, a snap action thermostatic element adapted to move the movable contact out of engagement with the normally stationary contact with a snap action when heated to a predetermined temperature by the heater, and to move the movable contact into engagement with the normally stationary contact with a snap action at a predetermined lower temperature, means actuated by the thermostatic element to move the normally stationary contact out of the range of movement of the movable contact after a predetermined number of movements of the movable contact, and a second thermostatic element subject to ambient temperature and adapted to physically oppose the first thermostatic element upon variations in ambient temperatures.

11. In an electric switch, in combination, a stationary contact, a movable contact, a bimetal snap action disc for actuating the movable contact into and out of engagement with the stationary contact, a heater to actuate the disc and a thermostatic element operatively connected to the disc for physically opposing the disc on changes in ambient temperature.

12. An overload cutout comprising, in combination, a pair of contacts for controlling an electric circuit, movable means affected by a condition of the circuit for moving at least one of said contacts into and out of engagement with the other, and supplemental means for moving the other of said contacts to prevent engagement of said contacts after a predetermined number of movements of said movable means.

13. In an overload cutout comprising a pair of mating contacts and a load responsive device, a thermal snapping member responsive to said device for actuating said contacts, and a thermostatic element associated with said member to physically oppose and hence modify the action thereof in accordance with variations in ambient temperature.

14. In an overload cutout comprising a pair of mating contacts and a load responsive device, a first thermostatic snapping disc responsive to said device for actuating said contacts, and a second thermostatic disc connected with said first disc, said two discs being adapted to physically oppose each other on a temperature change so that one will compensate the other for variations in ambient temperature.

15. In an overload cutout comprising a pair of mating contacts and a load responsive device, a pair of rigidly connected thermostatic discs for actuating said contacts, said discs being adapted to exert forces in opposite directions and hence physically oppose each other on a change in ambient temperature so that one will compensate the other for variations in ambient temperature, and one of said discs being affected by said load responsive device.

ALWIN B. NEWTON.